United States Patent [19]

Yamamoto et al.

[11] Patent Number: 4,695,598

[45] Date of Patent: Sep. 22, 1987

[54] EPOXY RESIN COATING COMPOSITION

[75] Inventors: Hiraku Yamamoto; Toshimichi Suzuki; Shigeru Katayama; Isao Uratsuka; Eishi Asoshina, all of Osaka, Japan

[73] Assignee: Nitto Electric Industrial Co., Ltd., Osaka, Japan

[21] Appl. No.: 847,333

[22] Filed: Apr. 2, 1986

[30] Foreign Application Priority Data

Apr. 3, 1985 [JP] Japan ................................. 60-70397

[51] Int. Cl.[4] .............................................. C08K 3/08
[52] U.S. Cl. .................................... 523/400; 523/427;
525/524; 525/530
[58] Field of Search ................ 523/427, 400; 525/524, 525/530, 930; 252/512

[56] References Cited

U.S. PATENT DOCUMENTS

| | | | |
|---|---|---|---|
| 3,395,118 | 7/1968 | Reinking et al. | 525/524 |
| 3,873,637 | 3/1975 | Fujiwara et al. | 525/524 |
| 3,904,813 | 9/1975 | Groff | 525/524 |

*Primary Examiner*—Lewis T. Jacobs
*Attorney, Agent, or Firm*—Sughrue, Mion, Zinn, Macpeak, and Seas

[57] ABSTRACT

An epoxy resin coating composition comprising a rubber-modified epoxy resin which is obtained by reacting an epoxy resin with a carboxyl group-containing butadiene-acrylonitrile rubber, a phenoxy resin, a metal powder, a curing component, and an organic solvent. This composition is especially useful as a coating for fuel tanks particularly, gasohol fuel tanks. The cured coating from the composition has excellent properties of heat resistance, chemical resistance, corrosion resistance, flexibility and weldability.

8 Claims, No Drawings

EPOXY RESIN COATING COMPOSITION

FIELD OF THE INVENTION

The present invention relates to an epoxy resin-based coating composition and more particularly to an epoxy resin-based coating composition which is especially suitable for use as a coating material for fuel tanks and, particularly, for gasohol fuel tanks.

BACKGROUND OF THE INVENTION

Epoxy resins generally have excellent characteristics in electrical insulating property, heat resistance, corrosion resistance, adhesive property and so on, and can be used in the form of a liquid, a paste, a sheet and a powder. Therefore, the epoxy resins can be used in various fields. Further, various compositions are possible, making it possible to vary the characteristics of cured product depending upon the purpose of use. This is one of the reasons that the epoxy resins are widely used.

However, despite such excellent characteristics, it is difficult for the epoxy resin to have both the chemical resistance and the flexibility. Therefore, in the case where a flexible epoxy resin or a rubber-modified epoxy resin is used to improve the flexibility, the chemical resistance generally deteriorates. On the other hand, where the crosslinking density of the epoxy resin after curing is increased to improve the chemical resistance, the flexibility deteriorates.

Under the above circumstances, as a result of an intensive study, it has been found that the co-use of specific resins of a rubber-modified epoxy resin and a phenoxy resin can impart both the chemical resistance and the flexibility, and due to the use of the rubber-modified epoxy resin, an excellent adhesiveness can be exhibited over a broad temperature range of from room temperature to a high temperature. It has been further found that the addition of a curing agent and an organic solvent to a composition comprising the rubber-modified epoxy resin and phenoxy resin can provide an epoxy resinbased paint having excellent properties of chemical resistance and flexibility, and a further addition of metal powder to the above resin composition can impart spot weldability to the resulting composition. The present invention has been established based on the above findings.

SUMMARY OF THE INVENTION

Accordingly, an object of the present invention is to provide an epoxy resin coating composition comprising a rubber-modified epoxy resin which is obtained by reacting an epoxy resin with a carboxyl group-containing butadiene-acrylonitrile rubber, a phenoxy resin, a metal powder, a curing component and an organic solvent.

DETAILED DESCRIPTION OF THE INVENTION

In the epoxy resin composition according to the present invention, the rubber-modified epoxy resin contributes to maintain the heat resistance and chemical resistance, the rubber component maintains high adhesive strength due to its stress-relaxation effect, and the phenoxy resin contributes to exhibit excellent flexibility and impact resistance.

Furthermore, use of the metal powder in the present invention makes it possible to weld coated steel plates which are obtained by coating the paint of the present invention and heating the coating. Use of the organic solvent can improve the surface flatness, film thickness uniformity and workability during coating.

The epoxy resin coating composition according to the present invention uses the rubber-modified epoxy resin as mentioned above, thereby forming a heterophase structure after heat curing. The particles of the rubber not only relax the residual stress at curing, thereby preventing decrease of adhesiveness of the cured product of epoxy resin, but also afford a large energy absorbing capacity, thereby improving the impact resistance. The rubber-modified epoxy resin used is such that the carboxyl groups of its rubber component are reacted with the epoxy groups of its epoxy resin component, and the rubber and epoxy resin phases are firmly bonded at the interface. Therefore, even in the two phase system of the heterophase structure, the cured resin maintains its high strength, so that decreases in physical properties due to poor compatibility which is caused when the epoxy resin is simply blended with a rubber-like polymer do not occur.

On the other hand, where the rubber-modified epoxy resin is not used, a stress-relaxation component is not present and, accordingly, the residual stress at curing remains so that the resin coating is under application of stress, and the impact resistance decreases as the adhesive strength decreases.

Examples of the epoxy resin which can be used to produce the rubber-modified epoxy resin according to the present invention include bisphenol A type epoxy resin, bisphenol F type epoxy resin, cycloaliphatic epoxy resin, hydantoin type epoxy resin, novolac type epoxy resin, glycidyl ester type epoxy resin and so on. From the standpoint of chemical resistance, however, the epoxy novolac resin is preferred. The epoxy resin generally has the epoxy equivalent of from about 100 to about 3,500. The rubber-modified epoxy resin must have at least 2 or more free epoxy groups per molecule in order to maintain the reactivity as the epoxy resin after the reaction between the carboxyl groups of the copolymer resin and the epoxy groups of the epoxy resin.

The carboxyl group-containing butadiene-acrylonitrile rubber which can be used in the present invention preferably has a linear molecular structure. This rubber generally has a molecular weight of from 1,000 to 5,000, preferably from 3,000 to 4,000. The average number of carboxyl groups per molecule of the rubber is generally from 1.5 to 2.5 and preferably from 1.8 to 2.4. Preferred is a rubber having carboxyl groups at both terminals i.e., carboxyl-terminated butadiene-acrylonitrile rubber. Commercially available products of such rubber include Hycar CTBN (B. F. Goodrich Chemical; liquid nitrile rubber with an acrylonitrile content of about 10–30 wt %, an acid equivalent per 100 g of 0.07, and an average molecular weight of 3,400). Examples of Hycar CTBN are 1,300×8, 1,300×9, 1,300×13 and 1,300×15.

The rubber-modified epoxy resin used in the present invention can be produced by melt kneading the epoxy resin with the rubber under heating at about 80 to 180° for 0.5 to 4 hours. The rubber-modified epoxy resin thus obtained does not substantially contain carboxyl groups. However, the resin containing residual carboxyl groups in some degree can also be used in the present invention. In general, the resin containing about 10% or less of residual carboxyl group based on the initial carboxyl content can be used in the present invention.

The present invention encompasses not only the use of the rubber-modified epoxy resin alone but also the use thereof in combination with epoxy resin. The epoxy resin which can be co-used may be any epoxy resins which can be used in the production of the rubber-modified epoxy resin.

The rubber component content in the rubber-modified epoxy resin is preferably 5 to 35% by weight.

When the weight parts of epoxy resin and copolymer rubber used in the production of rubber-modified epoxy resin are expressed as A and B, respectively, the rubber component content is calculated by $$\frac{B}{A + B} \times 100 \text{ (wt \%)}$$

Further, the rubber component content in the case where an additional epoxy resin component A' is used after production of the rubber-modified epoxy resin is calculated by $$\frac{B}{A + A' + B} \times 100 \text{ (wt \%)}$$

If the rubber component content decreases, the stress-relaxation effect by the addition of the rubber component is not observed in the cured product and an improvement in adhesiveness cannot be recognized. On the other hand, if the rubber component content is too high, the characteristics such as heat resistance and chemical resistance deteriorate.

The rubber-modified epoxy resin used in the present invention must retain the reactivity as the epoxy resin even after all the carboxyl groups of the rubber have reacted with the epoxy groups. Generally, the epoxy equivalent of the rubber-modified epoxy resin used in the present invention is from 200 to 5,000 equivalents and, preferally from 250 to 4,000 equivalents.

In order to obtain such a rubber-modified epoxy resin, the carboxyl-containing polymer and the epoxy resin are compounded, for example, in the resin production stage, in an amount of at least 2.3 equivalents of epoxy groups per equivalent of carboxyl group.

The phenoxy resin which is used in the present invention is preferably a high molecular weight phenoxy resin having a molecular weight of from 20,000 to 100,000 so as to exhibit excellent characteristics such as flexibility and impact resistance. Examples of such phencxy resin which are commercially available are solvent-type resins such as Epikote 1255HX30 (a product of Yuka-Shell Epoxy), Araldite 488-E-32 and 488-N-40 (products of Ciba Geigy), etc., and solid type resins such as Phenoxy PKHH, PKHJ and PKHC (products of Union Carbide). When the amount of the rubber-modified epoxy resin and phenoxy resin used in mixing the resin components are expressed as C and D, respectively, the phenoxy resin content is calculated by $$\frac{D}{C + D} \times 100 \text{ (wt \%)}$$

When the additional epoxy resin A' is used in the mixing, the phenoxy resin content is calculated by $$\frac{D}{C + D + A'} \times 100 \text{ (wt \%)}$$

The phenoxy resin content is preferably within the range of from 40 to 90% by weight. When the phenoxy resin content is too small, sufficient flexibility and impact resistance cannot be obtained and if the content is too large, the heat resistance and chemical resistance deteriorate.

The organic solvent used in the present invention is selected from the standpoint of the solubility of the rubber-modified epoxy resin and phenoxy resin. Examples of the organic solvent include cellosolve acetate, methyl ethyl ketone, methyl isobutyl ketone, dimethylformamide, acetone, cyclohexanone, glyccl ether, etc. These solvents can be used alone or in combination. These active organic solvents can be partially replaced with inert organic solvents such as hydrocarbons, halogenated hydrocarbons, alcohols and so on. From the standpoint of coating workability and coating uniformity, the organic solvent is preferably used in an amount of from 60 to 85% by weight based on the total weight of the coating composition.

Examples of the curing agent used in the present invention include mercaptan type curing agents, amine type curing agents, polyamide type curing agents, boron type curing agents, dicyandiamide type curing agents, hydrazide type curing agents, imidazole type curing agents, phenol type curing agents, and acid anhydride type curing agents. However, from the standpoint of storage stability of the epoxy resin coating composition, dicyandiamide type, hydrazide type and phenolic curing agents are preferred. If the curing temperature is too high or the cure time is prolonged when such a curing agent is used, a curing accelerator may be concurrently used in an amount within the range which does not adversely affect the storage stability of the composition. Examples of such accelerators include alkyl-substituted guanidine type, 3-substituted phenyl-1,1-dimethylurea type, imidazole type, imidazoline type, tertiary amine type, monoaminopyridine type and amine-imide type accelerators.

In accordance with the present invention, in order that steel plate coated with the epoxy resin composition can be welded after heat curing the coating, a metal powder is added to the composition. Suitable examples of the metal powder include powder of zinc, nickel, cadmium, stainless steel and aluminum. Of those powders, aluminum powder is preferred. The amount of the metal powder added must be at least 25% by weight based on the weight of the solids content in the epoxy resin coating composition in order to impart sufficient electrical conductivity to the coating. If the amount of metal powder exceeds 75% by weight, the continuous coating cannot be obtained so that the corrosion resistance, flexibility and adhesion of the coating tend to deteriorate. To maintain flatness of coating appearance of the coating, the metal powder containing at least 99 percent of fine particles having a particle diameter of 37 microns or less is preferred.

The incorporation of a silane coupling agent in the mixture of resin and curing components in the present invention results in further improvements in water resistance, chemical resistance and adhesiveness. Preferred examples of such silane coupling agent are silane compcunds of the formula $XSiY_3$ wherein X is a non-hydrolyzable organic group such as vinyl, methacryloxypropyl, aminoalkyl, mercaptoalkyl, epoxyalkyl, etc., and Y is a hydrolyzable group such as halogen, alkoxy, etc. Specific examples thereof include γ-aminopropyltriethoxysilane, vinyltriacetoxysilane and so on. The silane coupling agent is used in an amount of 5 parts by weight or less, preferably from about 0.2 to 3 parts by weight, per 100 parts by weight of the resin component.

Within the range that does not impair the weldability of the product due to the metal powder after coating and heat curing, various additives such as fillers e.g., silica, clay, gypsum, calcium carbonate, barium sulfate, quartz powder, glass fiber, kaolin, mica, alumina, hydrated alumina, aluminum hydroxide, talc, dolomite, zirconium compounds, titanium compounds, molybdenum compounds, antimony compounds, etc.; pigments; aging inhibitors; and other additives conventionally used can be added to the epoxy resin coating composition of the present invention depending upon the intended use and the desired properties.

The coating composition according to the present invention can be used as coatings for various articles in various fields and is particularly useful as a coating material for gasohol fuel tanks. As is well known, gasohol fuel is gasolin containing alcohols such as methanol and ethanol. Conventional gasolin tanks are made of tern metal sheet or galvanized steel plate, but if such materials are used for the construction of tanks for gasohol, the corrosion resistance thereof is poor. To improve the corrosion resistance, i.e., the solvent resistance, coating of the tanks with a coating material is recently made. The characteristics required as the coating are that solvent resistance, moldability and spot weldability are excellent. According to the studies by the present inventors, it has been found that the epoxy resin coating composition of the present invention is sufficiently satisfied with all of those three requirements essential to gasohol fuel tanks. Thus, the coating composition according to the present invention is highly suitable for use as a coating material for gasohol fuel tanks and, particularly, for gasohol fuel tanks made of tern metal sheet.

The following examples and comparative examples are further illustrative of the present invention. In the examples, all parts and percents are by weight.

EXAMPLE 1

80 Parts of novolac epoxy resin having an epoxy equivalent of about 175 and a molecular weight of about 370 and 20 parts of a carboxyl-terminated butadieneacrylonitrile rubber having a molecular weight of 3,400, an average carboxyl group number of 1.9 and an acrylonitrile content of 18% were reacted in a still at 140° C. for 2 hours to obtain a rubber-modified epoxy resin.

To 40 parts of the rubber-modified epoxy resin thus obtained were added 200 parts of a phenoxy resin having a molecular weight of about 30,000 (solvent content: 70%), 108 parts of aluminum paste (solvent content: 35%), 3.2 parts of dicyandiamide, 0.08 parts of tetramethylguanidine, and 341 parts of ethylcellosolve acetate, and the resin components were dissolved to obtain an epoxy resin coating.

The characteristics of the final product after curing at 200° C. for 5 minutes are shown in Table 1 below.

COMPARATIVE EXAMPLES 1 TO 7

Using the rubber-modified epoxy resin prepared in Example 1, the epoxy resin coatings shown in Table 1 were produced.

The characteristics of the final products after curing at 200° C. for 5 minutes are shown in Table 1 below.

EXAMPLE 2

50 Parts of the novolac epoxy resin and 50 parts of butadiene-acrylonitrile copolymer resin which were the same type as used in Example 1 were reacted in a still at 160° C. for 1 hour to obtain a rubber-modified epoxy resin.

To 4 parts of the rubber-modified epoxy resin thus obtained were added 10 parts of a novolac epoxy resin, 6 parts of a bisphenol A type epoxy resin having an epoxy equivalent of about 190 and a molecular weight of about 380, 267 parts of the same phenoxy resin as used in Example 1, 286 parts of the same aluminum paste as used in Example 1, 1.6 parts of dicyandiamide, 1 part of 3-(3,4-dichlorophenyl)-1,1-dimethylurea and 896 parts of methyl isobutyl ketone, and the resin components were dissolved in the solvent to obtain an epoxy resin coating composition.

The characteristics of the final product after curing at 150° C. for 2 hours are shown in Table 2.

EXAMPLE 3

To 12 parts of the rubber-modified epoxy resin prepared in Example 2 were added 8 parts of the same novolac epoxy resin as used in Example 1, 267 parts of the same phenoxy resin as used in Example 1, 154 parts of the same aluminum paste as used in Example 1, 1.6 parts of dicyandiamide, 1 part of 3-(3,4-dichlorophenyl)1,1-dimethylurea and 136 parts of methyl isobutyl ketone, and the resin components were dissolved in the solvent to obtain an epoxy resin coating composition.

The characteristics of the final product after curing at 150° C. for 2 hours are shown in Table 2.

COMPARATIVE EXAMPLES 8 TO 11

Using the rubber-modified epoxy resin prepared in Example 2, the various epoxy resin coating materials shown in Table 2 were prepared. The characteristics of the final product after curing at 150° C. for 2 hours are shown in Table 2.

TABLE 1

|  | Example 1 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Formulation |  |  |  |  |  |  |  |  |
| (a) | 40 | 100 | — | 40 | 70 | 5 | 40 | 40 |
| (b) | 200 | — | 333 | 200 | 43 | 136 | 200 | 200 |
| (c) | 108 | 108 | 108 | — | 108 | 108 | 38 | 154 |
| (d) | 3.2 | 8 | — | 3.2 | 5.6 | 0.4 | 3.2 | 3.2 |
| (e) | 0.08 | 0.2 | — | 0.08 | 0.14 | 0.01 | 0.08 | 0.08 |
| (f) | 341 | 496 | 239 | 169 | 477 | 431 | 231 | 406 |
| Viscosity (sec.) | 42 | 12 | 159 | 138 | 14 | 23 | 115 | 31 |
| Heating | 200° C. × 5 min. | | | | | | | |

TABLE 1-continued

| | Example 1 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| conditions | | | | | | | | |
| Adhesiveness (kg/cm$^2$) | 12 | 15 | 6 | 11 | 14 | 7 | 13 | 11 |
| Spot weldability | Possible | Possible | Possible | Impossible | Possible | Possible | Impossible | Possible |
| Appearance of coating | | | | | | | | |
| Formability | No abnormality | Coating peeled | No abnormality | No abnormality | Coating peeled | No abnormality | No abnormality | Coating cracked |
| (A) | No abnormality | No abnormality | Coating peeled | No abnormality | No abnormality | No abnormality | No abnormality | No abnormality |
| (B) | No abnormality | No abnormality | Coating peeled | No abnormality | No abnormality | Coating peeled | No abnormality | No abnormality |

Notes:
(a) Rubber-modified epoxy resin
(b) Phenoxy resin (solvent content 70 wt %)
(c) Aluminum paste (solvent content 35 wt %)
(d) Dicyandiamide
(e) Tetramethylguanidine
(f) Ethylcellosolve acetate
(A) Methanol resistance (20° C.)
(B) Methanol resistance (50° C.)

TABLE 2

| | Example 2 | Example 3 | Comparative Example 8 | Comparative Example 9 | Comparative Example 10 | Comparative Example 11 |
|---|---|---|---|---|---|---|
| Formulation | | | | | | |
| (a) | 4 | 12 | 20 | 1 | 4 | 4 |
| (g) | 10 | 8 | — | 19 | 16 | 16 |
| (h) | 6 | — | — | — | — | — |
| (b) | 267 | 267 | 267 | 267 | 267 | 267 |
| (c) | 286 | 154 | 154 | 154 | 154 | 154 |
| (d) | 1.6 | 1.6 | 1.6 | 1.6 | 1.6 | 1.6 |
| (i) | 1 | 1 | 1 | 1 | 1 | 1 |
| (j) | 869 | 136 | 136 | 136 | 7 | 1586 |
| Viscosity (sec.) | 30 | 400 | 380 | 400 | Cannot be measured | Cannot be measured |
| Heating conditions | 150° C. × 2 hr | | | | | |
| Adhesiveness (kg/cm$^2$) | 10 | 13 | 14 | 6 | — | — |
| Appearance of coating | | | | | | |
| Initial | No abnormality | No abnormality | No abnormality | No abnormality | Uniform coating impossible | Uniform coating impossible |
| (A) | No abnormality | No abnormality | Coating peeled | No abnormality | — | — |
| (B) | No abnormality | No abnormality | Coating peeled | No abnormality | — | — |

Notes:
(g) Novolac epoxy resin
(h) Bisphenol A epoxy resin
(i) 3-(3,4-Dichlorophenyl)-1,1-dimethylurea
(j) Methyl isobutyl ketone (1) Measured at 20° C. using Ford Cup No. 4 according to JIS-K5402.
(2) Each steel plate (SPCC-SD, 150×150×0.8 mm) was coated with the coating composition in a cured coating thickness of 5 to 10 μm and, after heating, the adhesiveness was evaluated with an adhesion tester. The dolly and the coating were bonded using a two-part cold-setting epoxy resin adhesive.
(3) Each steel plate (SPCC-SD, 150×150×0.8 mm) was coated with the coating composition in a cured coating thickness of 5 to 10 μm and, after heating, the two coated steel plates were superimposed and spot-welded under optimum welding conditions to investigate as to whether the coated plates were weldable.
(4) Each steel plate (SPCC-SD, 150×150×0.8 mm) was coated with the coating composition in a cured coating thickness of 5 to 10 μm and, after heating, subjected to cylinder-drawing at a diameter of about 50 mm under a load of 4,000 kg/m$^2$ using an Amsler universal testing machine. The coating after molding was visually examined for peelings and cracks.
(5) Each steel plate (SPCC-SD, 150×150×0.8 mm) was coated with the coating composition in a cured coating thickness of 5 to 10 μm and, after heating, was immersed in the solvent at the specified temperature for 30 days. The coating was visually examined for peelings and cracks.

It will be apparent from the above examples and comparative examples that the epoxy resin coating composition according to the present invention has excellent adhesiveness, chemical resistance, heat resistance, flexibility and weldability.

While the invention has been described in detail and with reference to specific embodiments thereof, it will be apparent to one skilled in the art that various changes and modifications can be made therein without departing from the spirit and scope thereof.

What is claimed is:

1. An epoxy resin coating composition comprising a rubber-modified epoxy resin which is obtained by reacting an expoxy resin with a carboxyl group-containing butadiene-acrylonitrile rubber, a phenoxy resin, a metal powder, a curing component, and an organic solvent, wherein the amount of phenoxy resin is from 40 to 90 percent by weight based on the total weight of said phenoxy resin and rubber-modified epoxy resin and wherein the amount of said metal powder is from 25 to 75 percent by weight based on the weight of the solids content in the composition.

2. An epoxy resin coating composition as in claim 1, wherein said rubber-modified epoxy resin has a rubber content of from 5 to 35% by weight.

3. An epoxy resin coating compositions as in claim 1, wherein said epoxy resin used to prepare the rubber-modified epoxy resin is a polyfunctional novolac epoxy resin containing at least two epoxy groups in the molecule.

4. An epoxy resin coating composition as in claim 1, wherein the amount of said organic solvent is from 60 to 85% by weight based on the weight of the whole coating composition.

5. An epoxy resin coating composition as in claim 1, wherein said curing component is a dicyandiamide, hydrazide or phenolic curing agent or a combination of such a curing agent and a curing accelerator.

6. An epoxy resin coating composition as in claim 1, wherein said epoxy resin composition further contains an epoxy resin.

7. An epoxy resin coating composition as in claim 1, wherein said epoxy resin composition is a coating composition for gasohol fuel tanks.

8. An epoxy resin coating compostion as in claim 1, wherein the carboxyl group-containing butadieneacrylonitrile rubber is a carboxyl-terminated butadiene-acrylonitrile rubber.

* * * * *